Patented June 18, 1935

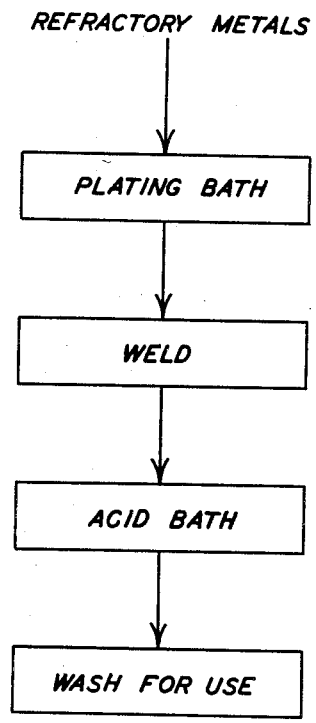

2,005,256

UNITED STATES PATENT OFFICE 2,005,256

METHOD OF SPOT WELDING REFRACTORY METALS

William W. Eitel and Jack McCullough, San Bruno, Calif., assignors to Heintz & Kaufman, Ltd., San Francisco, Calif., a corporation of Nevada Application January 2, 1934, Serial No. 704,895

6 Claims. (Cl. 219—10)

Our invention relates to a method of spot welding refractory metals, one to another, and more particularly to a method of making thermionic tube control electrodes of refractory metal wires.

Among the objects of our invention are: to provide a method of spot welding similar or dissimilar refractory metals; to provide a method of spot welding refractory metal control wires to refractory metal support wires in a vacuum tube grid; to provide a method of spot welding fine tantalum wires to heavier tungsten wires; and to provide a method for making a strong alloy joint in the spot welding of refractory metals.

Other objects of our invention will be apparent or will be specifically pointed out in the description forming a part of this specification, but we do not limit ourselves to the embodiment of the invention herein described, as various forms may be adopted within the scope of the claims.

The figure represents steps in a preferred application of our method.

In the construction of modern thermionic tubes, particularly those designed for transmitting purposes utilizing high output powers, it has become quite customary to utilize, for the various electrodes, refractory metals. In the same class of tubes the leads through the vitreous envelope are customarily made from tungsten, as this material readily seals to boro-silicate glass which has high heat resistance. Examples of metals from which electrodes are commonly made are tantalum and tungsten. These metals are, however, seldom used for grids. It is very unusual to directly spot weld tungsten to tungsten, tungsten to tantalum, or in fact to spot weld any of the refractory metals to each other or one another because of the fact that it is difficult, if not impossible, to set up sufficient heat to obtain a true weld wherein the metals at the point of contact have run or melted together. Various expedients other than welding have been resorted to in order to obtain a solid joint. Certain of these expedients require a socket into which a lead wire may fit, and a crimp is made and a weld superimposed if desired.

Furthermore, it would be quite desirable, in many cases, to utilize a highly refractory metal for the fine wires of a grid, provided such fine wires could be securely welded to refractory supports. Heretofore molybdenum has been the preferred material for grid control wires. Although molybdenum, with its relatively low melting point, is classed as a refractory metal, it will make a good weld with nickel supports, although difficulty is encountered in welding even molybdenum wires to tungsten supports. Grid control wires of tantalum and tungsten are desirable. These wires can be welded to soft metal supports, such as nickel, without great difficulty as the nickel flows around the refractory wires. They do not, however, make good welds with tungsten, tantalum or other refractory metals.

Our invention has to do with the efficient and satisfactory welding of refractory metal control wires or similar embodiments to refractory metal supports, and is particularly useful in making multiple welds such as where a plurality of fine grid wires are welded to a common support member of refractory material.

In broad terms, our method of welding two refractory metals comprises plating one of these wires with a thin coating of nonrefractory metal, preferably nickel, making a spot weld, and subsequently removing the plating from the welded structure. In this respect we may state that we are familiar with the method used in the art which consists of placing a thin piece of nickel sheet between two members of refractory metal and making the weld through the nickel, leaving the thin sheet in place about the weld thereafter. Such a method, however, is not suitable where a large number of welds are to be made close together, as in a grid, as a large amount of the third metal would remain on the structure after the weld has been made.

Such a weld is unsatisfactory in tubes subjected to high heat during operation for two reasons. First, the free nonrefractory metal evaporates during the operation of the tube and causes trouble of various sorts. The second and more serious objection to such a weld is that in sectioning the weld it will be found that the metal actually connecting the two refractory metals is almost entirely nickel, whatever alloying taking place having been made very close to the junction of the surfaces of each of the refractory metals and the nickel. The joint, therefore, between the two refractory metals is not in fact a direct joining of the two refractory metals, the two refractory metals being joined by a connecting link of either pure nickel or an alloy extremely high in nickel. Such a joint is liable to loosen, under extreme heat, and is not to be relied upon in tubes of high power.

The broadest aspect of our invention, then, is that we have found that a solid joint between refractory metals can be made when the plating of the nonrefractory metal, such as nickel, is relatively thin, the reason therefor being apparently that the nickel enables the weld to be made, and yet the amount of nickel is so small that after the weld has taken place the nickel at the weld has been entirely alloyed with the refractory metals, and that this alloy thus formed at the joint has an extremely small amount of nickel therein. There appears to be no portion consisting of nickel alone. Such a joint will stand extremely high temperatures without danger of melting apart within the temperature range of the refractory metals themselves. The application of our invention to thermionic tube construction is very simple, and as an illustration we prefer to describe the construction of a vacuum tube grid, such as might be used in an oscillator or generator of high frequency currents.

While there are many types of construction used for such grids, we prefer to describe our invention as applied to making a grid wherein a spiral control wire, preferably of fine section, is fastened with a plurality of welds to a pair of parallel supports. In this example fine tantalum control wires will be welded to tungsten supports. While it may be preferable, in some cases, to plate both the control wires and the supports, we have found that, in most cases, it will only be necessary to plate the support members.

The tungsten supports are therefore placed in a nickel plating bath of the usual composition well known in the art, and a coating of nickel applied. We have found that this coating need not be of any substantial thickness, the amount thereon being such as is supplied by the trade and called a "flash" coating. It is quite possible that such a coating is not more than a few molecules thick. While it is possible to make welds with a much heavier coating we have found that the heavier coating is entirely unnecessary, and if the coating is too heavy the percentage of nickel in the weld may become too high to make a safe weld, and in addition more difficulty is encountered in removing the coating. The proper amount of nickel to deposit on the support wires is easily found by trial, and usually is sufficient when the support just begins to show to the eye that nickel is being uniformly deposited thereon. A short series of trial welds can be made to find the optimum time required for the plating process, the plating being stopped when it is found that satisfactory welds are being obtained. There appears to be no useful purpose in going beyond this point. When the support wires are plated they may be mounted in the customary mandrel, and the control wires wound thereon, and the welds made with the usual grid spot welder. It will be found that the welds, if properly made, are solid and firm and that the two materials weld easily.

After the entire structure has been welded it may be taken off the mandrel and the remainder of the plating, which has not entered into the welds, removed. The removal step may best be accomplished by dipping the grid in a mild acid bath which will dissolve the nickel but will not attack the tantalum or tungsten. Such baths are available to all those skilled in the art, and will vary in composition somewhat in accordance with the refractory metals used and the nonrefractory material used for plating. It is also possible to evaporate off the metal in vacuo if desired, so we do not wish to be limited to any particular means of removing the nickel.

We have found that welds between refractory metals can be made in this way by spot welding, which are fully as strong as any known welds between refractory metals, and which are not subject to the objection of welds made when any considerable amount of nickel, or other intermediate metal, is included between the two refractory metals.

While we have described our method as applied to the welding of grids, other uses of the method will be apparent and obvious to those skilled in the art.

We claim:

1. The method of spot welding refractory metal wires which comprises coating at least one of said wires with a layer of non-refractory metal too thin to leave an unalloyed remainder at the point of fusion, and spot welding said wires through said layer.

2. The method of spot welding refractory metal wires which comprises coating at least one of said wires with a layer of nickel too thin to leave an unalloyed remainder at the point of fusion, and spot welding said wires through said layer.

3. The method of spot welding refractory metal wires which comprises coating at least one of said wires with a layer of metal of a lower melting point too thin to leave an unalloyed remainder at the point of fusion, and spot welding said wires through said layer.

4. The method of joining metal wires having a relatively high melting point which comprises separating said wires by a layer of metal having a relatively low melting point and having a volume sufficiently small to leave no unalloyed remainder at the point of fusion, and spot welding said wires through said layer.

5. The method of joining metal wires having a relatively high melting point which comprises separating said wires by a layer of nickel having a volume sufficiently small to leave no unalloyed remainder at the point of fusion, and spot welding said wires through said layer.

6. The method of joining tungsten, tantalum or similar wires which comprises separating said wires by a layer of nickel having a volume sufficiently small to leave no unalloyed remainder at the point of fusion, and spot welding said wires through said layer.

WILLIAM W. EITEL.
JACK McCULLOUGH.